United States Patent [19]

Brunner et al.

[11] 4,340,892

[45] Jul. 20, 1982

[54] DOPPLER NAVIGATION ANTENNA HAVING AUTOMATIC LAND-SEA ERROR CORRECTION

[75] Inventors: Anton Brunner, Wangen; Werner Jatsch, Neubiberg, both of Fed. Rep. of Germany

[73] Assignee: Siemens Aktiengesellschaft, Berlin & Munich, Fed. Rep. of Germany

[21] Appl. No.: 95,888

[22] Filed: Dec. 7, 1970

[30] Foreign Application Priority Data

Dec. 12, 1969 [DE] Fed. Rep. of Germany ....... 1962436

[51] Int. Cl.³ ............................................ H01Q 13/10
[52] U.S. Cl. ..................................... 343/768; 343/771
[58] Field of Search ................ 343/771, 768, 858, 813

[56] References Cited

U.S. PATENT DOCUMENTS 3,281,851 10/1966 Goebels, Jr. ...................... 343/768
3,508,275 4/1970 Deveau et al. ..................... 343/768

*Primary Examiner*—Theodore M. Blum
*Attorney, Agent, or Firm*—Hill, Van Santen, Steadman, Chiara & Simpson

[57] ABSTRACT

A doppler navigation antenna having automatic land-sea error correction through the utilization of two somewhat differently inclined lobe groups consisting of four lobes each, and employing a plane radiator group which comprises a plurality of individual radiators arranged in parallel rows. Each end of each radiator is fed by a pair of feed lines which extend transversely in the rows, the individual feed lines of each pair of feed lines having slightly different phase delay characteristics.

15 Claims, 7 Drawing Figures

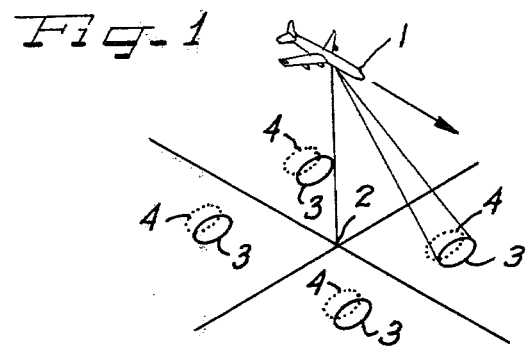
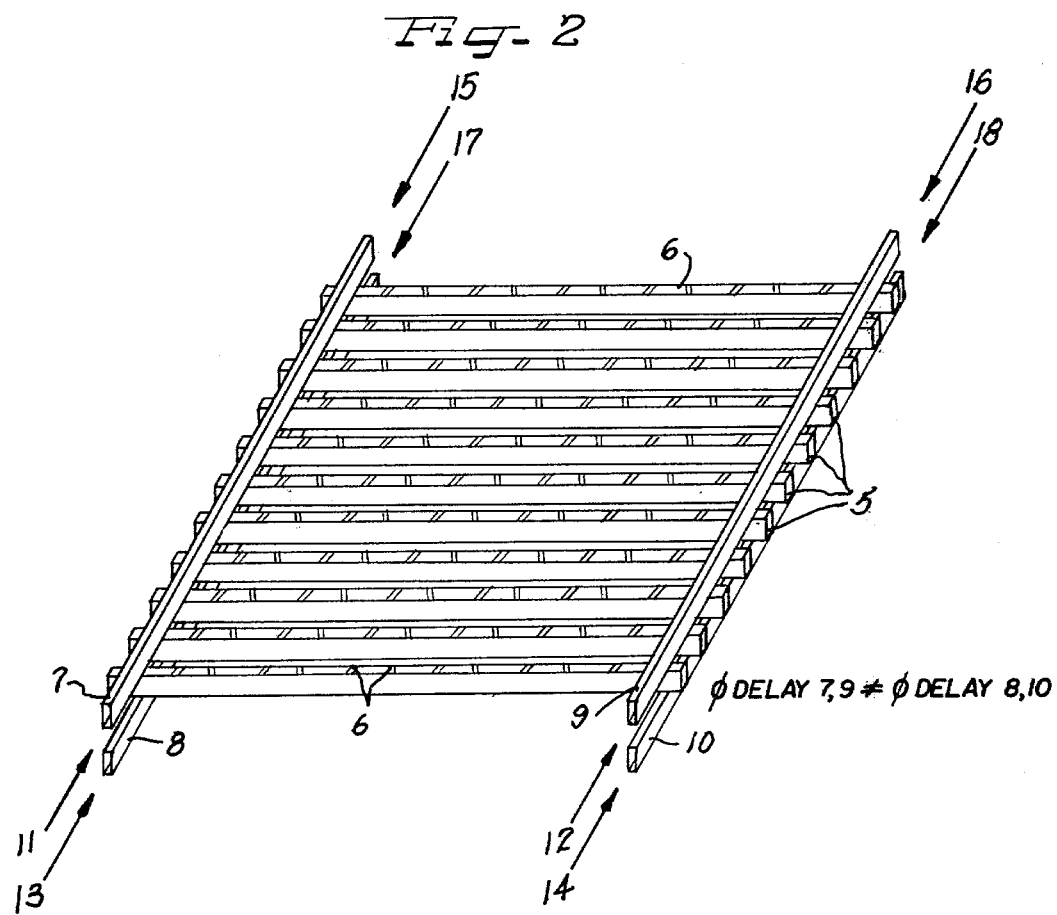

DOPPLER NAVIGATION ANTENNA HAVING AUTOMATIC LAND-SEA ERROR CORRECTION

BACKGROUND OF THE INVENTION

1. Field of the Invention

The invention relates to a doppler navigation antenna with an automatic land-sea error correction by the production of two somewhat differently inclined lobe groups (beam lobing) consisting each of four lobes, and employing a plane radiator group, consisting of individual radiators arranged in parallel rows, the ends of which are fed by feed lines extending transversely to the rows and provided at both of their two ends, each with feed points.

2. Description of the Prior Art

In doppler navigation methods radar beams are directed from the object in flight toward the ground and the doppler displacement of the reflected waves is measured. Only those speed components cause the known frequency shifts which reflect in the direction of the radar beam. In order to obtain the speed components for the movement in space, at least three measurements have to be made in different directions, which must not lie in one plane. In methods with continuous measurement, this signifies the necessity of providing at least three beams. A fourth beam is usually provided for substitution purposes.

The known methods make possible a relatively high accuracy of measurement in the navigation over land, while over water, above all, an error appears which is due to the dependency of the reflection energy from the incident-beam angle on the water. This error may be explained by realizing that the energy of the ground echo over land is independent of the incident-beam angle, while the return-beam energy over water changes appreciably—both with the incident-beam angle as well as also with the surface condition (motion of the sea). In this manner, the frequency spectrum of the echo signals is distorted with respect to the frequency spectrum received over land, which leads to an erroneous shifting or displacement of the measured frequency center. It is therefore necessary that a correction be made when flying over water.

With most of the systems heretofore employed, this correction is made by employing a so-called land-sea switch. This method, however, as a compromise eliminates solely an error transmitted over water, independently of the motion of the sea, and this results in an additional load on the pilots. Additionally, this method requires a ground-view or the knowledge of the territory flown over.

For the determination of the dependency of the reflected energy from the angle of incidence, which is different for land and sea, an automatic land-sea error correction may be derived. For this purpose, it is known to radiate with a doppler navigation antenna three or four differently inclined lobes to the ground and in addition usually offset in time, and in addition to radiate three of four lobes more which, however, are changed slightly with respect to the first four lobes in their inclination (beam lobing). The difference in energy of two adjacent beams is different and depends on the motion of the sea, so that also a correction dependent on motion of the sea may be derived.

The previously known systems employ for the production of the two groups of lobes, either two separate antennae which are arranged adjacent one another, or two interstacked antennae. Since for the two antennae together mostly only one predetermined surface is available, while with two separate antennae both are only half as large and therewith the beam width in one plane twice as large, and accordingly is less favorable. With two antennae interstacked or telescoped, there are disposed between two antennae, for example, slotted hollow conductors of the one antenna and of the other antenna. In this manner, the distances of the emitters of the one antenna become so large that several main lobes occur. If, however, at one antenna inlet, two main lobes occur, then the signals of these two lobes differ solely through their different doppler frequencies, which can no longer be separated in slowly flying aircraft, for example helicopters.

SUMMARY OF THE INVENTION

An object of the invention is to overcome the disadvantages of the known antennae for the doppler navigation. In accordance with the invention, which relates to an antenna of the type mentioned at the beginning, this problem is solved thereby, that the beam-group has at both ends of the parallel rows in each case a pair of feed lines extending transversely to the rows, and that the two conductors of one of each of the two feed line pairs are so constructed that they differ slightly in their phase delay. Upon feed in each case of one line of the pair of feed lines, particularly in each case one of the two with the same phase delay, there results a different inclination of the lobe group with respect to the feed of the other two feed lines in longitudinal direction of the feed lines. This is attained with a single antennae arrangement found in both cases in operation, whereby only the two feed lines of each pair of feed lines in each case are separated at the source of feed or in the receiving case are connected at the receiving point, respectively.

BRIEF DESCRIPTION OF THE DRAWINGS

Other objects, features and advantages of the invention, its organization, construction and operation will be best understood from the following detailed description of preferred embodiments thereof, taken in conjunction with the accompanying drawings, in which:

FIG. 1 shows an aircraft with the two groups of lobes transmittable to the ground;

FIG. 2 shows an entire antenna arrangement, according to the invention, in a perspective view;

DESCRIPTION OF THE PREFERRED EMBODIMENTS

Figure 3:
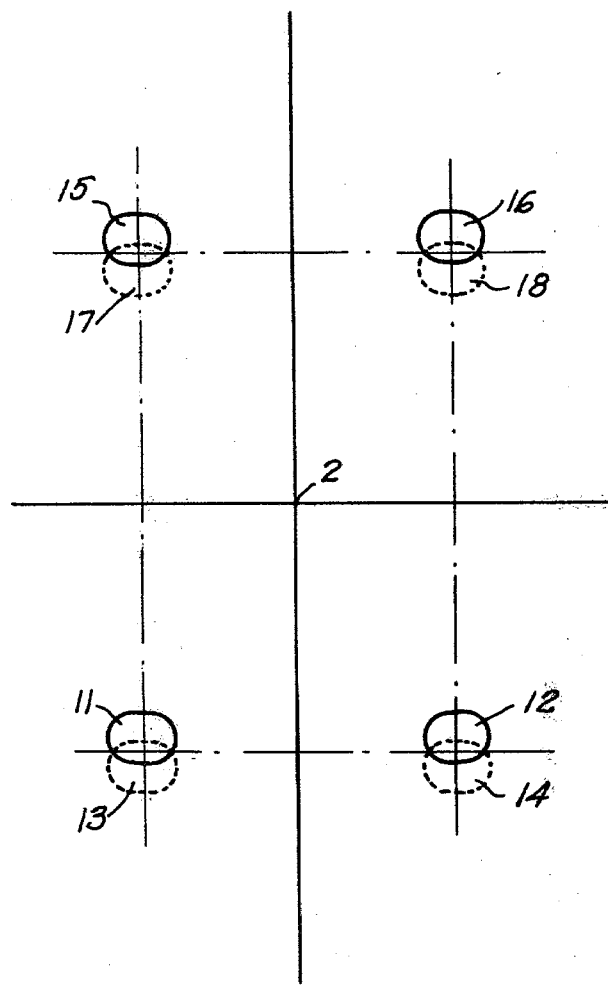
FIG. 3 shows the position of the eight main lobes radiated from the antenna and viewed from above.

FIG. 1 shows an aircraft 1 vertically over the terrain point 2 and which radiates with its doppler navigation antenna the lobe group 3 and a second lobe group 4, whereby the two lobe groups 3 and 4 are slightly differently inclined with respect to the perpendicular to the aircraft on the ground. However, only three measurements—that is, three beams in different directions—which must not lie in one plane are necessary, but it is of advantage to have available still one substitute beam. With the two lobe groups 3 and 4 the dependency of the reflected energy from the angle of incidence, which is different for land and sea, may be determined, so that from the energy relations of the signals received, an automatic land-sea error correction is derivable.

The doppler navigation antenna arrangement shown in FIG. 2 consists of a group of eleven rectangular hollow wave guide 5, in whose one narrow side, a plurality of narrow and in alternating direction inclined slots 6 are milled. The constant slot spacing from center to center of the slots is somewhat larger than one-half wave length. If a progressive wave runs in a hollow wave guide 5 slotted in this manner, then a radiation somewhat inclined to the start of the hollow wave guide 5 is produced. When fed at both ends there are formed two oppositely inclined beams. The beam direction and the diagram form are dependent on the frequency of the hollow wave guide dimension as well as the number, the spacing and the inclination of the slots, etc. With increasing slot inclination the uncoupled energy increase, and an inclination increase symmetrically toward the hollow wave guide center is of advantage for the side lobe attenuation.

Each one of the eleven hollow wave guides 5 with the slot rows is at both of its ends connected with two feed hollow wave guide 7, 8 and 9, 10, respectively, and coupled to the same. By suitable dimensioning, there are also produced progressive waves in the feed hollow wave guides 7, 8, 9 and 10. The feed hollow wave guides 7 and 9 have similar phase delay, likewise the feed hollow wave guides 8 and 10. Both hollow wave guides 7 and 8 and 9, 10, respectively, of each pair differ from one another slightly in their time delay. This is attained either by varying the cross-section dimensions or by the introduction of dielectrics.

The feed points 11, 12, 15 and 16 for the production of the one lobe group are disposed at the ends of the hollow wave guides 7 and 9, while the feed points, 13, 14 17 and 18 for the second, differently inclined lobe group are provided at the ends of both feed hollow wave guides 8 and 10. Also, in the feed hollow wave guides is advantageously arranged a slot inclination which increases toward the center, in particular to produce an increasing coupling in the radiation hollow wave guides, for the diminution of the side lobe.

In FIG. 3 is illustrated the position of the eight main lobes which are radiated from the antenna, when the latter is fed at the feed points indicated in FIG. 2. For the reception the same arrangement is used. The meeting point of the perpendicular from the object in flight toward the ground is indicated by 2. Both lobe groups are differently inclined in longitudinal direction of the feed hollow wave guides. This direction is in agreement in the embodiment by way of example with the direction of flight.

The FIGS. 4a, 4b, 4c and 4d illustrate different possibilities in the coupling of a pair of feed hollow wave guides to a hollow wave guide slot radiating array, which at the same time serves for the optimization of the mutual uncoupling of the two feed hollow wave guides of a pair.

Figure 4A:
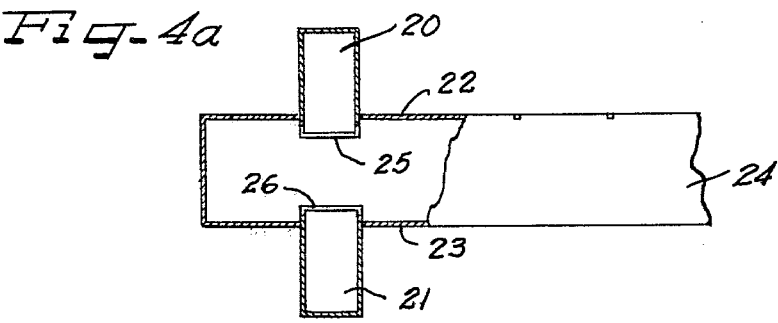
FIGS. 4a, 4b, 4c and 4d show the possibilities of connecting a pair of hollow feed lines to a hollow wave guide radiator, each figure in cross-sectional view.

In FIG. 4a the two feed hollow wave guides 20 and 21 of a pair of feed hollow wave guides are arranged on oppositely disposed side walls 22 and 23 of a hollow wave guide slot radiating array 24 having a rectangular cross-section. A part of the hollow wave guide 20 and 21 projects into the hollow wave guide slot radiating array 24, and is there connected with the same by the slots 25 and 26.

Figure 4B:
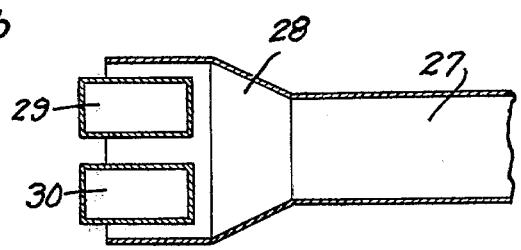

In the arrangement according to FIG. 4b, the hollow conductor slot radiating array 27 is formed at one end into a chamber 28 into which the two slotted hollow wave guides 29 and 30 of a feed line pair partially extend.

Figure 4C:
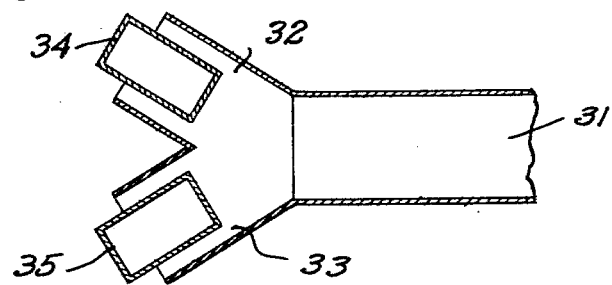

FIG. 4c illustrates a hollow wave guide slot radiating array 31 which has a fork-shaped end, into each branch 32 and 33 of which projects a pair of slotted hollow wave guides 34 and 35 of a pair of feed lines.

Figure 4D:
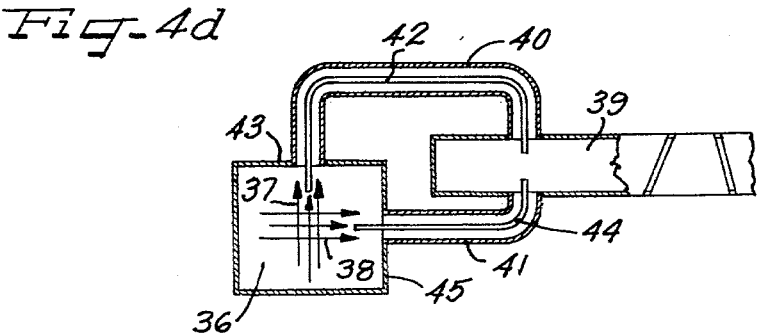

In FIG. 4d the pair of feed hollow wave guide is replaced by a single hollow wave guide 36 which guides two $H_{10}$ waves, which are polarized perpendicularly to one another and are indicated by the arrows 37 and 38. Their time delays, which are determined by the dimension in the particular H-planes, differ corresponding to the side-relation in the cross-section of the hollow wave guide 36. The connection to a hollow wave guide radiating array 39 takes place by way of two coaxial conductors 40 and 41. The inner conductor 42 of the coaxial conductor 40 projects through a side wall 43 into the interior of the hollow wave guide 36 and the inner conductor 44 extends through the side wall 45 likewise in the interior of the hollow wave guide 36. On the other side of the coaxial conductors 40 and 41, the inner conductors 42 and 44 enter into the interior of the hollow wave guide slot radiating array 39.

In the same manner, the rows of the hollow conductor slot radiating arrays may be replaced by other series of radiating arrays, for example microstrip aerials or dipole-antennae. Also the feed lines need not be constructed as hollow conductors, because for example coaxial conductors may also be employed.

Although we have disclosed our invention by reference to certain specific illustrative embodiments thereof, many changes and modifications may become apparent to those skilled in the art without departing from the spirit and scope of the invenion. It is therefore to be understood that we intend to include within the patent warranted hereon all such changes and modifications as may reasonably and properly be included within the scope of our contribution to the art.

What we claim is:

1. A doppler navigation antenna with automatic land-sea correction utilizing the production of two somewhat differently inclined lobe groups of four lobes each, comprising a plane radiator group including a plurality of individual radiating arrays arranged in parallel rows, each of said radiating arrays including two ends having respective feed points, a first pair of feed lines extending transversely of said radiating arrays and coupled thereto at the respective feed points at one end thereof, and a second pair of feed lines extending transversely of said radiating arrays and coupled thereto at the respective feed points at the other end thereof, one feed line of each pair having a different phase delay than the other feed line of the same pair.

2. A doppler navigation antenna according to claim 1, wherein said feed lines comprise coaxial conductors.

3. A doppler navigation antenna according to claim 1, wherein said feed lines comprise strip conductors.

4. A doppler navigation antenna according to claim 1, wherein said radiator group comprises hollow wave guide slot radiating arrays.

5. A doppler navigation antenna according to claim 1, wherein said radiator group comprises dipole radiating arrays.

6. A doppler navigation antenna according to claim 1, wherein said radiator group comprises periodically curved line radiating arrays.

7. A doppler navigation antenna according to claim 1, wherein said radiator group comprises slot radiating arrays.

8. A doppler navigation antenna according to claim 1, wherein each pair of feed lines comprises hollow wave guides.

9. A doppler navigation antenna according to claim 8, wherein the individual wave guides of each pair of said feed lines have different cross-sectional dimensions.

10. A doppler navigation antenna according to claim 8, wherein the individual wave guides of each pair of said feed lines have different dielectric characteristics.

11. A doppler navigation antenna according to claim 8, wherein the radiating arrays comprise hollow wave guides of rectangular cross-section and the wave guides of each pair of feed lines are coupled to said radiating arrays on opposite side walls of said radiating hollow wave guides.

12. A doppler navigation antenna according to claim 8, wherein each of said radiating arrays comprise hollow chambers at their ends, and said wave guides of said feed lines are coupled to said radiating arrays within said chambers.

13. A doppler navigation antenna according to claim 8, wherein each radiating array comprises a hollow wave guide having fork-shaped ends, and each of said hollow wave guide feed lines is coupled to each said radiating arrays within respective branches of the fork-shaped ends.

14. A doppler navigation antenna according to claim 8, wherein each feed line pair is formed of a single hollow wave guide of rectangular cross-section adapted to guide two polarized waves perpendicular with respect to one another to effect different time delays of the two wave structures in accordance with the side walls relationships of the hollow wave guide cross-section.

15. A doppler navigation antenna according to claim 14, comprising a pair of coaxial lines each having an inner conductor and an outer conductor, said outer conductors connecting adjacent side walls of said single hollow wave guide to oppositely disposed walls of a radiating array hollow wave guide, and said inner conductors following the same paths and extending into the radiating array hollow wave guides.

* * * * *